Jan. 1, 1957  J. S. NIDER ET AL  2,775,897
POWER TRANSMISSION APPARATUS
Filed Sept. 8, 1954
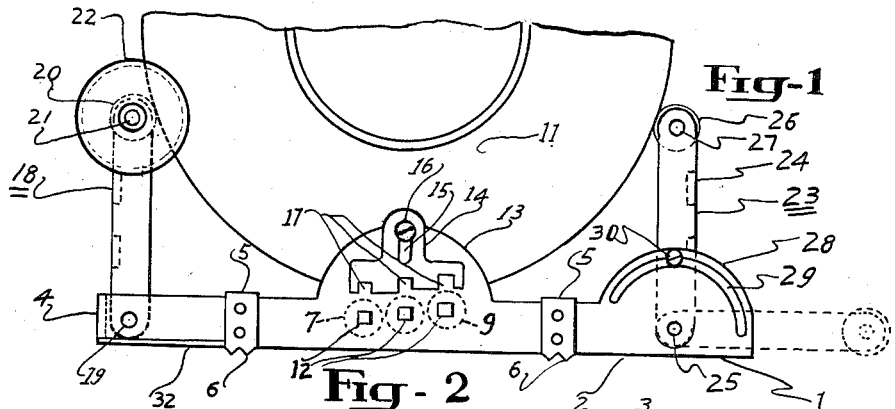
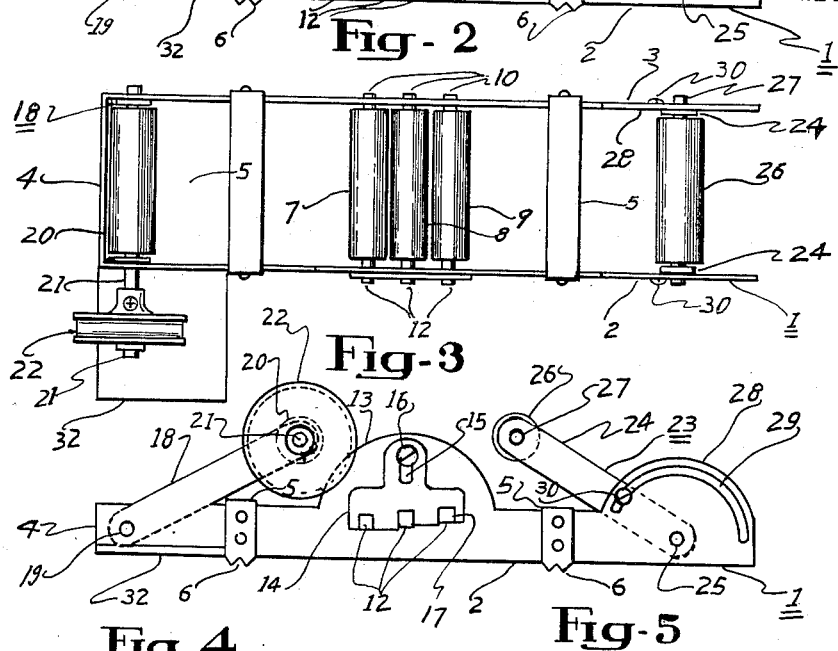
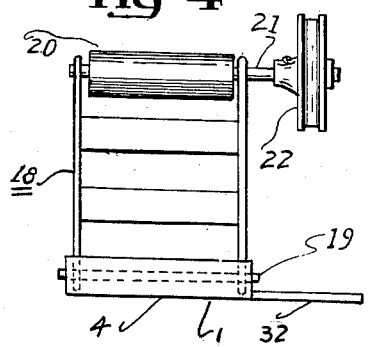
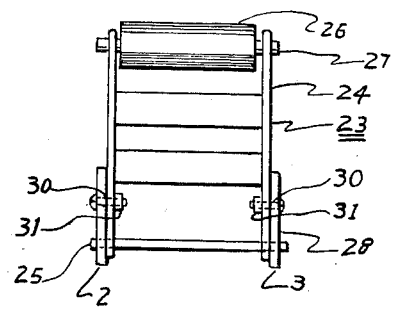
INVENTORS
JOSEPH S. NIDER
MICHAEL NIDER
JOHN NIDER
BY *Jack Snyder*
ATTORNEY

United States Patent Office 2,775,897
Patented Jan. 1, 1957

2,775,897
POWER TRANSMISSION APPARATUS

Joseph S. Nider, Michael A. Nider, and John F. Nider, Export, Pa.

Application September 8, 1954, Serial No. 454,671

1 Claim. (Cl. 74—14)

This invention relates to a power take-off apparatus for transmitting power from a driven motor vehicle wheel to various suitable types of machinery where other sources of power are not available.

Important objects and advantages of the invention are to provide an apparatus of the character described, which is simple in its construction and practical in its arrangement, which embodies novel means for running the drive wheel of the motor vehicle into position thereon, which is efficient and reliable in operation, compact, partially collapsible, and comparatively economical in its manufacture and maintenance, and otherwise well adapted for the purposes for which it is designed and intended.

To the accomplishment of these and other objects as will appear as the description proceeds, the invention resides in the novel construction, combination and arrangement of parts herein specifically described and illustrated in the accompanying drawing, but it is to be understood that changes in the form, proportions and details of construction may be resorted to than come within the scope of the claim hereunto appended.

In the drawing wherein like numerals of reference designate corresponding parts throughout the several views:

Figure 1 is a side elevational view of a power transmission apparatus, constructed in accordance with the invention, and showing the drive wheel of a motor vehicle mounted in position on the apparatus.

Figure 2 is a top plan view of the power transmission apparatus.

Figure 3 is a side elevational view of the apparatus in the partially collapsed position.

Figure 4 is an end view of the driving end of the apparatus.

Figure 5 is an end view of the mounting end of the device.

Referring in detail to the drawing, the improved power transmission apparatus comprises an oblong, rectangularly-shaped base frame 1 consisting of a pair of parallel disposed side members 2 and 3, and an end member 4 at the driving end of the apparatus. The base frame is reenforced by several fixed, transversely extending crossbars 5, which have depending, pointed ends 6 projecting slightly below the bottom edges of respective side members to prevent slippage of the device on any supporting surface.

Three similar supporting rollers, respectively indicated at 7, 8, and 9, are fixed on respective shafts 10, which are suitably journaled for rotation in respective side members 2, 3, of the base frame 1. The supporting rollers are disposed transversely in close parallel relation to each other with the supporting roller 8 being positioned slightly higher than the supporting roller 7 and with the supporting roller 9 being positioned slightly higher than the roller 8, whereby the supporting rollers decline at a slight angle, relatively to each other, from the horizontal toward the power end of the apparatus. Such relative positions of the supporting rollers tend to direct the driving vehicle wheel 11, supported thereon, toward the driving end of the apparatus, and further adapts the latter for use in connection with driving vehicle wheels of varying diameters.

Each of the shafts 10 has a squared end 12 which projects from the outer face of the side member 2. An upright supporting plate 13 is carried at the top edge of the side member 2 and is disposed directly above the squared ends 12 of the shafts 10. A locking plate 14 is positioned flatly against the outer face of the supporting plate 13 and is vertically adjustable on the latter. The locking plate is provided with a vertically extending slot 15 for the passage of a screw 16 which is engaged in the supporting plate 13, and operable for holding the locking plate in the adjusted position.

The locking plate 14 has the lower edge thereof provided with three squared notches 17 and when vertically adjusted on the supporting plate 13 will cause the engagement of the squared notches on respective squared shaft ends 12 to thereby hold the supporting rollers 7, 8, and 9 against rotation when it is required to remove the vehicle wheel 11 from the apparatus.

A suitably reenforced, rectangularly-shaped end frame 18 has the lower end thereof pivotally connected at the driving end of the side members 2, 3, by a transversely extending pivoting rod 19. A driving roller 20 is disposed transversely at the top of the end frame 18 and is fixed on a drive shaft 21, which is suitably journaled for rotation at the top of the end frame 18. The drive shaft 21 projects from the side member 2 and carries a fixed pulley 22 at the end thereof.

A suitably reenforced, rectangularly-shaped end frame 23 includes a pair of side arms 24, which are pivotally joined, at the lower ends thereof, at the mounting end of the side members 2, 3, by a pivoting rod 25. A roller 26 is fixed on a shaft 27 which is pivotally journaled for rotation at the upper end of the side arms 24 of the end frame 23.

A guide plate 28, provided with an arcuate slot 29, is carried at the top edge of each of the side members 2, 3, at the mounting end of the latter. A bolt 30, having a securing nut 31 engaged thereon, extends through each of the slots 29 and through respective side arms 24 of the end frame 23.

The end frame 23 may be shifted on its pivotal rod 25 to extend same outwardly in alignment with the base frame 1, as shown in dash lines in Figure 1. When so extended the end frame 23 serves as a ramp when mounting the wheel 11 on the apparatus. The roller 26 projects beyond the adjacent edges of the side arms 24 and consequently will rest against any supporting surface and thereby prevent the rotation of the roller 26 when the wheel 11 is travelling over same when mounting the apparatus.

After the vehicle wheel 11 has been mounted on the apparatus, the end frame 23 is shifted from the extended position to bring the roller 26 into frictional engagement against the vehicle wheel. The roller 26 is held in such engagement, by the adjustment of the bolts 30 and nuts 31, to stabilize the apparatus during the operation of the latter.

When the apparatus is not in use, it may be collapsed to some extent by folding the end frames 18 and 23 inwardly toward each other on their pivotal connections to rest upon the base frame 1 in the manner shown in Figure 3.

During the operation of the apparatus the end frame 18 is disposed in the upright position with the wheel 11 acting against and rotating the roller 20, thereby imparting rotation to the shaft 21 and pulley 22 from which power is transmitted by means of a belt or the like. The end frame 18 cannot shift outwardly from the erect engaged position as the end frame 18 abuts against the end member 3 of the base frame 1.

A base plate 32 projects laterally outward from the bottom edge of the side member 2, at the driving end of the latter, to stabilize the operation of the apparatus, and to provide supporting or connecting means for the machine to be driven by the operation of the apparatus.

The present invention provides a most efficient device of its kind, which may be economically constructed, and successfully employed for the purposes and in the manner herein set forth.

What we claim is:

An automobile wheel drive power transmission apparatus of the class described, comprising, in combination, an oblong rectangularly-shaped base frame including a pair of side members joined together at one end by an end member, a plurality of transversely extending supporting rollers rotatably mounted in said base frame for supporting the wheel and being disposed at varying elevations with respect to each other, means carried by said base frame operable for simultaneously securing said supporting rollers against rotation in said base frame, an end frame having the lower end thereof pivotally connected at the joined ends of said side members adjacent to said end member, said end frame abutting against said end member to prevent the outward movement thereof from the vertical in said base frame, a transversely extending drive shaft journaled for rotation in the upper end of said end frame, a transversely extending drive roller fixed on said shaft for driving engagement by the wheel, a power transmission pulley fixed on one end of said shaft, an adjustable end frame having the lower end thereof pivotally connected at the free ends of said side members and carrying a transversely rotatable roller at the upper end thereof for engagement by the wheel, and means engaging said base frame and said adjustable end frame for securing the latter in the adjusted position on said base frame.

References Cited in the file of this patent
UNITED STATES PATENTS

| | | |
|---|---|---|
| 1,371,618 | Grant | Mar. 15, 1921 |
| 2,042,573 | Wood et al. | June 2, 1936 |